United States Patent US 12,111,700 B2
Kim
Oct. 8, 2024

(54) ROLL-SLIDE DISPLAY DEVICE

(71) Applicant: LG Display Co., Ltd., Seoul (KR)

(72) Inventor: JunYoung Kim, Paju-si (KR)

(73) Assignee: LG Display Co., Ltd., Seoul (KR)

(*) Notice: Subject to any disclaimer, the term of this patent is extended or adjusted under 35 U.S.C. 154(b) by 0 days.

(21) Appl. No.: 18/484,146

(22) Filed: Oct. 10, 2023

(65) Prior Publication Data
US 2024/0036609 A1 Feb. 1, 2024

Related U.S. Application Data

(63) Continuation of application No. 17/868,181, filed on Jul. 19, 2022, now Pat. No. 11,815,959.

(30) Foreign Application Priority Data

Jul. 28, 2021 (KR) .......... 10-2021-0099359

(51) Int. Cl.
G06F 1/16 (2006.01)
G06F 3/041 (2006.01)

(52) U.S. Cl.
CPC .......... *G06F 1/1652* (2013.01); *G06F 1/1616* (2013.01); *G06F 1/1624* (2013.01); *G06F 3/0412* (2013.01)

(58) Field of Classification Search
CPC combination set(s) only.
See application file for complete search history.

(56) References Cited

U.S. PATENT DOCUMENTS

| 9,823,697 | B2 | 11/2017 | Hsu et al. | |
| 10,061,358 | B2 | 8/2018 | Lee et al. | |
| 10,203,531 | B2 | 2/2019 | Choi et al. | |
| 10,747,269 | B1* | 8/2020 | Choi | G06F 1/1641 |
| 10,880,417 | B1* | 12/2020 | Song | H04M 1/0268 |
| 10,955,876 | B1* | 3/2021 | Song | G06F 1/1652 |
| 11,543,859 | B2 | 1/2023 | Kwak et al. | |
| 11,563,835 | B2* | 1/2023 | Lim | G06F 1/1624 |
| 11,632,451 | B2* | 4/2023 | Song | H04M 1/0235 |
| | | | | 455/566 |
| 11,815,959 | B2* | 11/2023 | Kim | G06F 1/1616 |
| 2015/0116921 | A1 | 4/2015 | Hsu et al. | |
| 2019/0384438 | A1 | 12/2019 | Park et al. | |
| 2020/0267246 | A1* | 8/2020 | Song | H05K 1/148 |
| 2022/0019260 | A1 | 1/2022 | Kang et al. | |
| 2022/0037600 | A1* | 2/2022 | Song | H10K 59/12 |

(Continued)

FOREIGN PATENT DOCUMENTS

| KR | 101248013 B1 | 3/2013 |
| KR | 20200117741 A | 10/2020 |
| KR | 20210004407 A | 1/2021 |

*Primary Examiner* — Lisa Lea-Edmonds
(74) *Attorney, Agent, or Firm* — Seed IP Law Group LLP

(57) ABSTRACT

A roll-slide display device includes a first frame, a second frame, and a third frame which configure an outer periphery, a flexible display unit which includes a first area coupled to the first frame, a second area coupled to the third frame, and a third area located between the first area and the second area, and a magnet provided in the second frame, in which the flexible display unit includes a display panel and a magnetic sheet disposed on a rear surface of the display panel and the first frame slides to the left and right with respect to the second frame to implement a default state and an extended state.

19 Claims, 10 Drawing Sheets

(56) References Cited

U.S. PATENT DOCUMENTS

| | | | |
|---|---|---|---|
| 2022/0322550 A1 | 10/2022 | Yin | |
| 2023/0017380 A1* | 1/2023 | Kim | G06F 1/1652 |
| 2023/0036424 A1* | 2/2023 | Kim | G06F 1/1624 |
| 2023/0075243 A1* | 3/2023 | Song | G06F 1/1624 |
| 2023/0124270 A1 | 4/2023 | Ko et al. | |
| 2023/0185341 A1* | 6/2023 | Kim | G06F 1/1624 |
| | | | 455/575.4 |
| 2023/0421674 A1* | 12/2023 | Park | H04M 1/0268 |
| 2024/0036609 A1* | 2/2024 | Kim | G06F 1/1616 |
| 2024/0196706 A1* | 6/2024 | Son | H10K 59/873 |

\* cited by examiner

ROLL-SLIDE DISPLAY DEVICE

CROSS-REFERENCE TO RELATED APPLICATIONS

This application is a continuation of U.S. patent application Ser. No. 17/868,181, filed Jul. 19, 2022, which claims the priority of Korean Patent Application No. 10-2021-0099359 filed on Jul. 28, 2021, in the Korean Intellectual Property Office, the entire contents of which are incorporated herein by reference.

BACKGROUND

Technical Field

The present disclosure relates to a display device, and more particularly, to a roll-slide display device which has a flexible display and has an expandable screen.

Description of the Related Art

Recently, mobile terminals such as a wireless terminal, a personal digital assistant (PDA), a portable multimedia player (PMP), or an electronic notebook are being small-sized to ensure portability. However, since a user wants to receive various information such as character information, videos, still images, MP3, or games through a screen of the portable terminal, the user requires a large-sized or a wide-sized screen for the display unit. However, the reduction of the portable terminal results in reduction in the size of the screen of the display unit, so that there are limitations to satisfy both requirements.

In order to overcome the above-mentioned limitations, recently, a flexible display device such as a bendable display device, a foldable display device, or a roll-slide display device is being developed.

The flexible display device may be implemented by configuring a substrate with a plastic material. The flexible display device can be easily carried and implement a large screen so that the flexible display device may be applied to various fields including not only mobile equipment such as a mobile phone, an electronic book, or electronic newspaper, but also a television or a monitor.

BRIEF SUMMARY

Recently, a flexible display which has a sufficient elasticity to be largely deformed has been developed. Such a flexible display can be deformed to be rolled.

Embodiments of the present disclosure include a roll-slide display device. The roll-slide display device may protrude the flexible display to the outside of the body with a desired size while accommodating the rolled flexible display. Accordingly, the flexible display is used so that the roll-slide display device may have a more compact structure.

In order to use such a roll-slide display, the display may be withdrawn from the body and simultaneously, the display may be extended to a size desired by the user. However, when the roll-slide display device was changed from a default state to an extended state, the restoration of the deformation of the bent display was delayed, which can cause wrinkles.

Accordingly, embodiments of the present disclosure include a roll-slide display device with a new structure in which a magnetic sheet is disposed on a rear surface of the display panel, and a magnet was added on a second front surface portion of the opposing second frame to restore any wrinkled portions of the display device using a magnetic force.

Therefore, embodiments of the present disclosure provide a roll-slide display device which mitigates the wrinkles generated around the bent display.

Objects of the present disclosure are not limited to the above-mentioned objects, and other objects, which are not mentioned above, can be clearly understood by those skilled in the art from the following descriptions.

According to an aspect of the present disclosure, a roll-slide display device includes a first frame, a second frame, and a third frame which configure an outer periphery, a flexible display unit which includes a first area coupled to the first frame, a second area coupled to the third frame, and a third area located between the first area and the second area and a magnet provided in the second frame, in which the flexible display unit includes a display panel and a magnetic sheet disposed on a rear surface of the display panel and the first frame slides to the left and right with respect to the second frame to implement a default state and an expanded state.

Other detailed matters of the exemplary embodiments are included in the detailed description and the drawings.

According to the present disclosure, when the roll-slide display device is changed from a default state to an extending state, the wrinkles generated around the bent portion are mitigated to ensure the durability.

According to the present disclosure, an operation error of the roll-slide display device caused by the wrinkles may be improved.

The effects according to the present disclosure are not limited to the contents exemplified above, and more various effects are included in the present specification.

BRIEF DESCRIPTION OF THE SEVERAL VIEWS OF THE DRAWINGS

The above and other aspects, features, and other advantages of the present disclosure will be more clearly understood from the following detailed description taken in conjunction with the accompanying drawings, in which.

DETAILED DESCRIPTION

Figure 1:
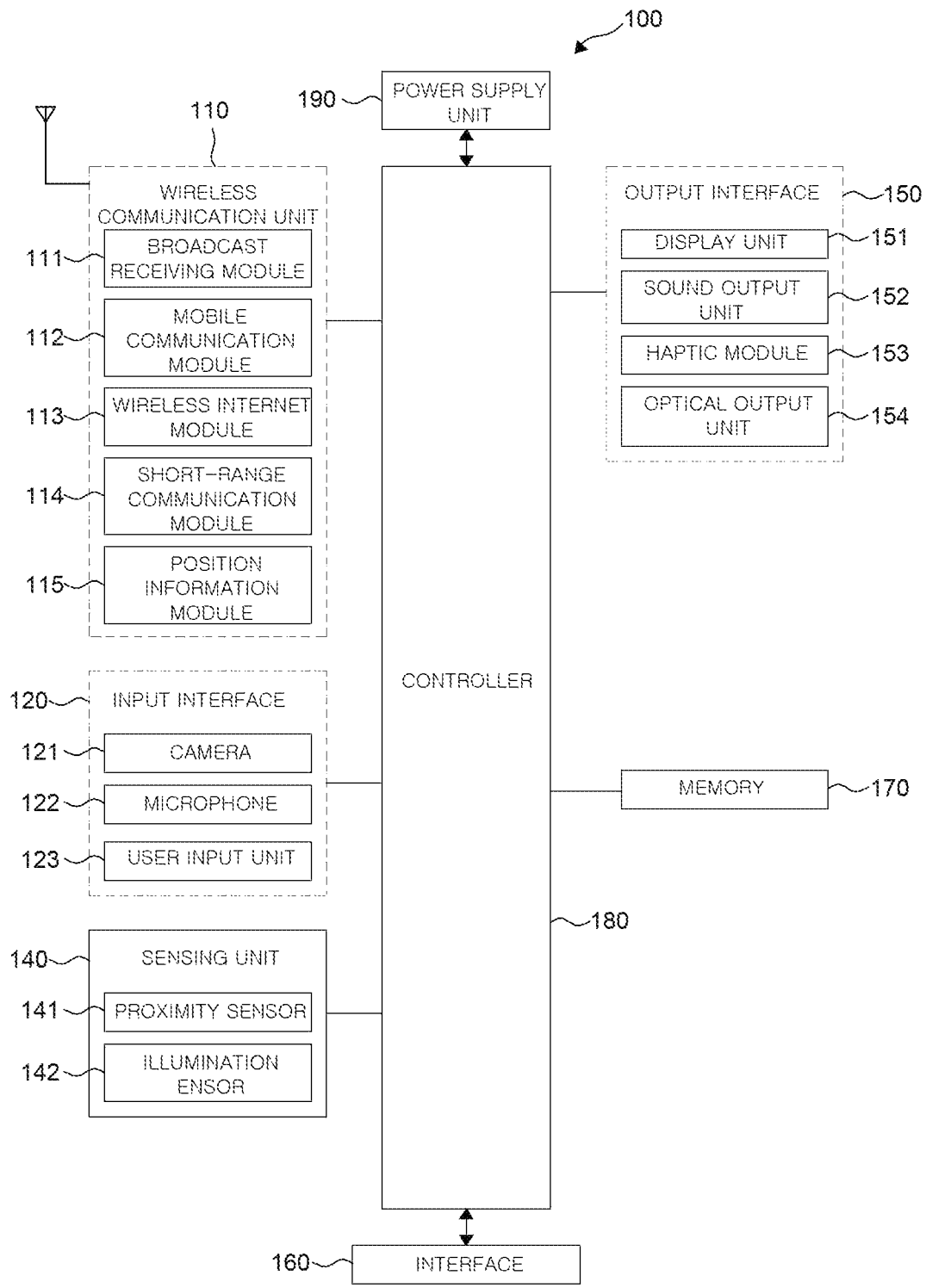
FIG. 1 is a block diagram for explaining a roll-slide display device according to an exemplary embodiment of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure. The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on," "above," "below," and "next," one or more parts may be positioned between the two parts unless the terms are used with the term "immediately" or "directly."

When an element or layer is disposed "on" another element or layer, another layer or another element may be interposed directly on the other element or therebetween.

Although the terms "first," "second," and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, various exemplary embodiments of the present disclosure will be described in detail with reference to the accompanying drawings.

FIG. 1 is a block diagram for explaining a roll-slide display device according to an exemplary embodiment of the present disclosure. Unless the context dictates otherwise, a "roll-slide display device" means a device in any form factor that is capable of displaying an image while also having a display screen that is deformable by rolling, by sliding, or both.

Referring to FIG. 1, a roll-slide display device 100 according to the exemplary embodiment of the present disclosure may include a wireless communication unit 110, an input interface 120, a sensing unit 140, an output interface 150, an interface 160, a memory 170, a controller 180, a power supply unit 190, and the like. Components illustrated in FIG. 1 are not essential for implementing the roll-slide display device 100 so that the roll-slide display device 100 described in this specification may include more components or less components than the above-described components.

To be specific, the wireless communication unit 110 may include one or more modules which allow wireless communication between the roll-slide display device 100 and the wireless communication system, between the roll-slide display device 100 and the other roll-slide display device, or between the roll-slide display device 100 and an external server. Further, the wireless communication unit 110 may include one or more modules which connect the roll-slide display device 100 to one or more networks.

The wireless communication unit 110 may include at least one of a broadcast receiving module 111, a mobile communication module 112, a wireless internet module 113, a short-range communication module 114, and a position information module 115.

First, the wireless communication unit 110 will be described. The broadcast receiving module 111 of the wireless communication unit 110 may receive a broadcasting signal and/or broadcasting-related information from an external broadcasting management server through a broadcasting channel. The broadcasting channel may include a satellite channel and a ground wave channel. Two or more broadcasting receiving modules 111 for simultaneous broadcasting reception or broadcasting channel switching for at least two broadcasting channels may be provided to the roll-slide display device 100.

The mobile communication module 112 may transmit and receive a wireless signal with at least one of a base station, an external terminal, and a server on a mobile communication network constructed in accordance with technical standards or communication schemes for the mobile communication (for example, global system for mobile communication (GSM), code division multi access (CDMA), CDMA2000, enhanced voice-data optimized or enhanced voice-data only (EV-DO), wideband CDMA (WCDMA), high speed downlink packet access (HSDPA), high speed uplink packet access (HSUPA), long term evolution (LTE), or long term evolution-advanced (LTE-A)).

The wireless signal may include voice call signaling, video call signaling, or various types of data in accordance with transmission or reception of a text/multimedia message.

The wireless internet module 113 refers to a module for wireless internet connection and may be embodied in the roll-slide display device 100 or installed at the outside of the roll-slide display device 100. Such a wireless internet module 113 is configured to transmit or receive the wireless signal in the communication network in accordance with wireless internet techniques.

The wireless internet technique includes, for example, wireless LAN (WLAN), wireless fidelity (Wi-Fi), Wi-Fi direct, digital living network alliance (DLNA), wireless broadband (WiBro), world interoperability for microwave access (WiMAX), high speed downlink packet access (HSDPA), high speed uplink packet access (HSUPA), long term evolution (LTE), long term evolution-advanced (LTE-A), and the like. The wireless internet module 113 may transmit or receive data in accordance with at least one wireless internet technique within a range including internet techniques which have not been described above.

From the viewpoint that the wireless internet connection by WiBro, HSDPA, HSUPA, GSM, CDMA, WCDMA, LTE, or LTE-A is performed by the mobile communication network, the wireless internet module 113 which performs the wireless internet connection through the mobile communication network may be understood as a type of the mobile communication module 112.

The short-range communication module 114 is provided for short range communication and may support the short range communication using at least one of Bluetooth™, radio frequency identification (RFID), infrared data association (IrDA), ultra wideband (UWB), ZigBee, NFC (near field communication), Wi-Fi (wireless-fidelity), Wi-Fi Direct, Wireless USB (wireless universal serial bus). The short-range communication module 114 may support wireless communication between the roll-slide display device 100 and the wireless communication system, between the roll-slide display device 100 and another roll-slide display device 100, or between the roll-slide display device 100 and a network in which another roll-slide display device 100 (or external server) is located, through the short-range wireless communication network. The short-range wireless communication network may be a short-range wireless personal area communication network.

The position information module 115 is a module for obtaining a position (or a current position) of the roll-slide display device 100 and a representative example thereof is a global positioning system (GPS) module or a wireless fidelity (Wi-Fi) module. For example, when the roll-slide display device 100 utilizes a GPS module, the roll-slide display device 100 may acquire a position of the roll-slide display device 100 using a signal sent from the GPS satellite. As another example, when the Wi-Fi module is utilized, the roll-slide display device 100 may acquire the position of the roll-slide display device 100 based on information of a wireless access point (AP) which transmits and receives wireless signals with the Wi-Fi module. If necessary, the position information module 115 may perform any function of another module of the wireless communication unit 110 to substitutionally or additionally obtain data on the position of the roll-slide display device 100. The position information module 115 is a module used to acquire a position (or a current position) of the roll-slide display device 100 and is not limited to a module which directly calculates or acquires the position of the roll-slide display device 100.

The input interface 120 may include a camera 121 or an image input unit which inputs an image signal, a microphone 122 or an audio input unit which inputs an audio signal, and a user input unit 123 (for example, a touch key or a mechanical key) which receives information from a user. Voice data or image data collected by the input interface 120 is analyzed to be processed as a control command of the user.

The camera 121 may process an image frame such as a still image or a moving image obtained by an image sensor in a video call mode or a photographing mode. The processed image frame may be displayed on the display unit 151 or stored in the memory 170. In the meantime, the plurality of cameras 121 provided in the roll-slide display device 100 may be disposed to form a matrix structure and a plurality of image information having various angles or focal points may be input to the roll-slide display device 100 through the cameras 121 which form the matrix structure. Further, the plurality of cameras 121 may be disposed to have a stereo structure to obtain a left image and a right image to implement a stereoscopic image.

The microphone 122 may process an external sound signal as electrical voice data. The processed voice data may be utilized in various forms in accordance with a function which is being performed by the roll-slide display device 100 (or an application program which is being executed). In the meantime, in the microphone 122, various noise removal algorithms which remove a noise generated during the process of receiving the external sound signal may be implemented.

The user input unit 123 receives information from the user and when the information is input through the user input unit 123, the controller 180 may control the operation of the roll-slide display device 100 so as to correspond to the input information. The user input unit 123 may include a mechanical input interface (or a mechanical key, for example, a button located on a front, rear, or side surface of the roll-slide display device 100, a dome switch, a jog wheel, a jog switch, or the like) and a touch type input unit. For example, the touch type input unit may be formed by a virtual key, a soft key, or a visual key which is disposed on the touch screen through a software process or a touch key which is disposed on a portion other than the touch screen. In the meantime, the virtual key or the visual key may be displayed on the touch screen with various shapes, and for example, may be formed by graphics, texts, icons, video, or a combination thereof.

The sensing unit 140 may include one or more sensors which sense at least one of information in the roll-slide display device 100, surrounding environment information around the roll-slide display device 100, and user information. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, a camera 121), a microphone 122, a battery gauge, an environment sensor (for example, a barometer, a hygrometer, a thermometer, a radiation sensor, a thermal sensor, a gas sensor, or the like), and a chemical sensor (for example, an electronic nose, a healthcare sensor, a biometric sensor, or the like). In the meantime, the roll-slide display device 100 disclosed in the present specification may combine and utilize information sensed by at least two sensors from the above-mentioned sensors.

The output interface 150 generates outputs related to vision, auditory, tactile, or the like and may include at least one of a display unit 151, a sound output unit 152, a haptic module 153, and an optical output unit 154. The display unit 151 forms a mutual layered structure with a touch sensor or is formed integrally to be implemented as a touch screen. The touch screen simultaneously may serve as a user input 123 which provides an input interface between the roll-slide display device 100 and the user, and provide an output interface between the roll-slide display device 100 and the user.

The sound output unit 152 may output audio data received from the wireless communication unit 110 or stored in the memory 170 in a call signal reception mode, a phone-call mode, a recording mode, a voice recognition mode, or a broadcasting reception mode. The sound output unit 152 may also output a sound signal related to a function (for example, a call signal reception sound, a message reception sound, or the like) performed in the roll-slide display device 100. Such a sound output unit 152 may include a receiver, a speaker, a buzzer, and the like.

The haptic module 153 may generate various tactile effects that the user may feel. A representative example of the tactile effect generated by the haptic module 153 may be vibration. An intensity, a pattern, and the like of the vibration generated in the haptic module 153 may be controlled by the selection of the user or a setting of the controller. For example, the haptic module 153 may compose different vibrations to output the composed vibrations or sequentially output the different vibrations.

The optical output unit 154 outputs a signal for notifying occurrence of an event using light of a light source of the roll-slide display device 100. Examples of events generated in the roll-slide display device 100 may be message reception, call signal reception, missed call, alarm, schedule notification, email reception, information reception through an application, and the like.

The interface 160 may serve as a channel with various external devices connected to the roll-slide display device 100. The interface 160 may include at least one of a wired/wireless headset port, an external charger port, a wired/wireless data port, a memory card port, a port which connects a device equipped with an identification module, an audio input/output (I/O) port, a video input/output (I/O) port, and an earphone port. The roll-slide display device 100 may perform appropriate control related to the connected external device in accordance with the connection of the external device to the interface 160.

The memory 170 may store data that supports various functions of the roll-slide display device 100. The memory 170 may store a plurality of application programs (or applications) driven in the roll-slide display device 100, data for operations of the roll-slide display device 100, and instructions. At least some of the application programs may be downloaded from the external server through wireless communication. At least some of the application programs may reside on the roll-slide display device 100 from the time of shipment for the basic functions (for example, call incoming, call outgoing, message receiving, or message sending function) of the roll-slide display device 100. In the meantime, the application program is stored in the memory 170 and is installed on the roll-slide display device 100 to be driven by the controller 180 to perform operations of the roll-slide display device 100.

In addition to the operation related to the application program, the controller 180 may generally control an overall operation of the roll-slide display device 100. The controller 180 may process a signal, data, information, or the like which is input or output through the above-described components or drive the application programs stored in the memory 170 to provide or process appropriate information or functions to the user.

Further, in order to drive the application program stored in the memory 170, the controller 180 may control at least some of the components described with reference to FIG. 1. Moreover, the controller 180 may combine and operate at least two of the components included in the roll-slide display device 100 to drive the application program.

The power supply unit 190 is applied with external power or internal power to supply the power to the various components included in the roll-slide display device 100 under the control of the controller 180. The power supply unit 190 includes a battery 191 and the battery may be an embedded battery or a replaceable battery.

At least some of the above-described components may operate in cooperation with each other to implement the operation, the control, or the control method of the roll-slide display device 100 according to various embodiments which will be described below. Further, the operation, the control, or the control method of the roll-slide display device 100 may be implemented on the roll-slide display device 100 by driving at least one application program stored in the memory 170.

Figure 2A:
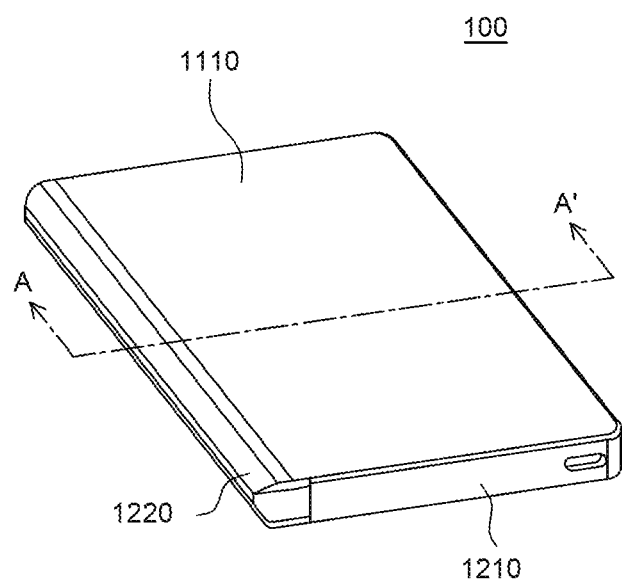
FIGS. 2A and 2B are perspective views of a roll-slide display device according to an exemplary embodiment of the present disclosure.
Figure 2B:
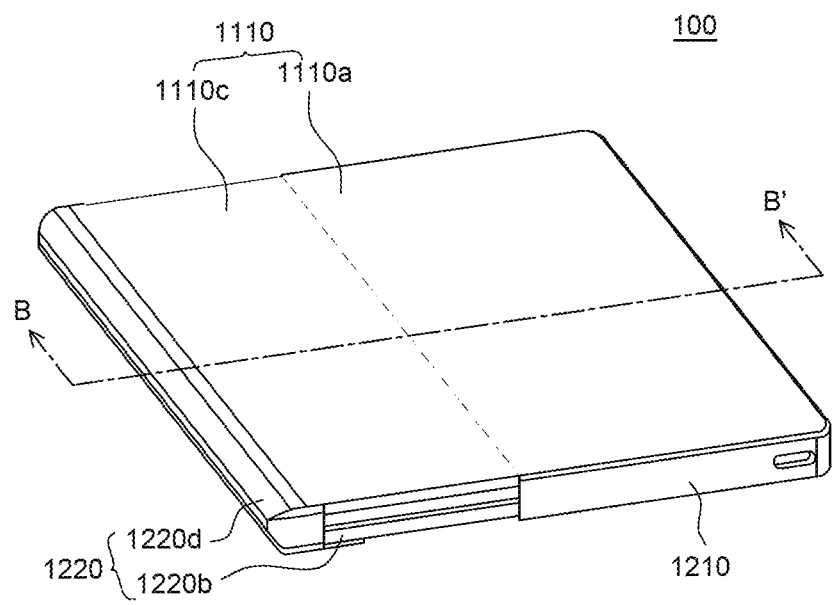

FIGS. 2A and 2B are perspective views of a roll-slide display device according to an exemplary embodiment of the present disclosure.

Figure 3A:
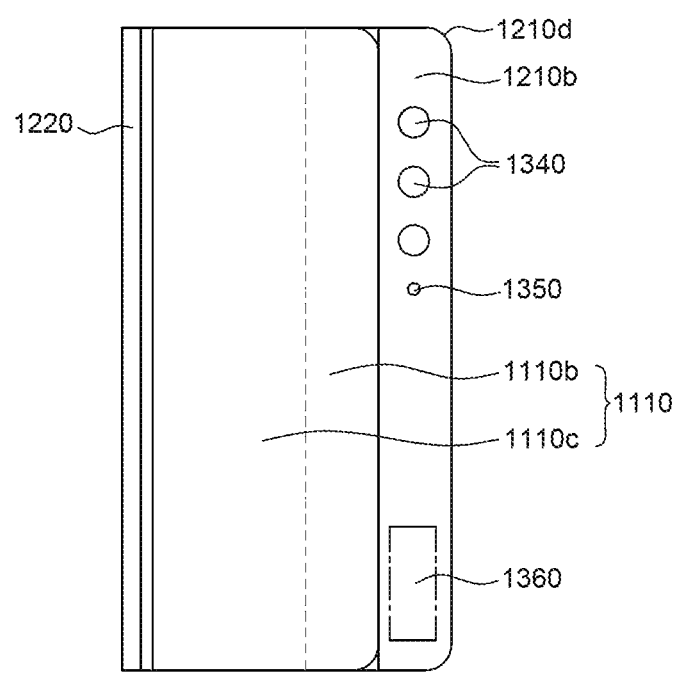
FIGS. 3A and 3B are rear views of a roll-slide display device according to an exemplary embodiment of the present disclosure.
Figure 3B:
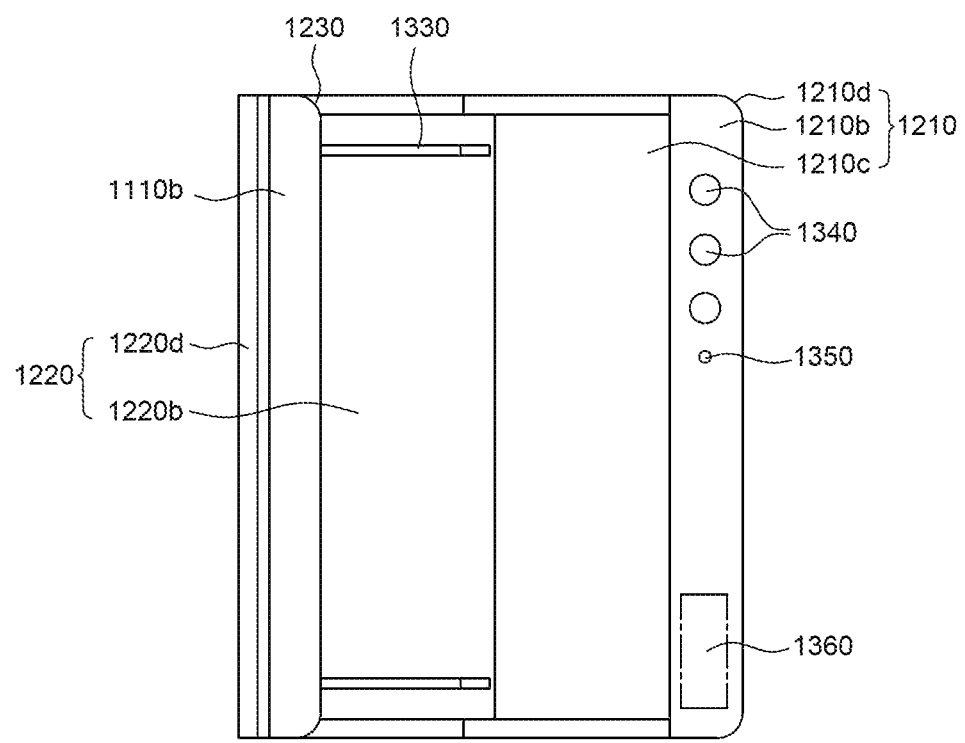

FIGS. 3A and 3B are rear views of a roll-slide display device according to an exemplary embodiment of the present disclosure.

Figure 4A:
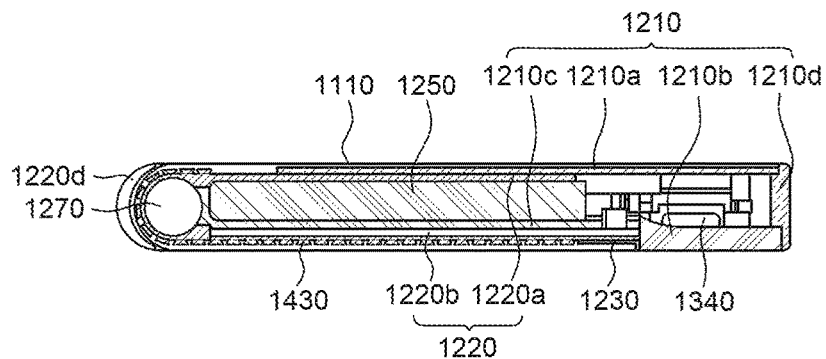
FIGS. 4A and 4B are cross-sectional views taken along the lines A-A' and B-B' of FIGS. 2A and 2B.
Figure 4B:
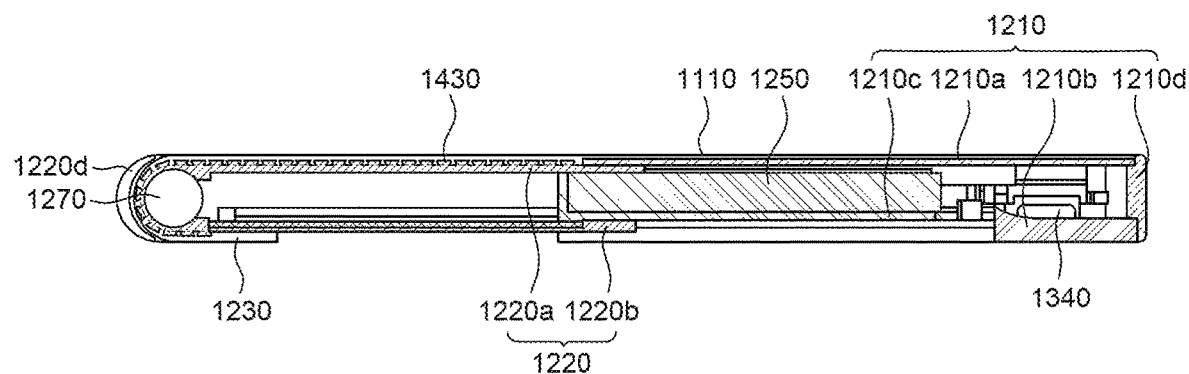

FIGS. 4A and 4B are cross-sectional views taken along the lines A-A' and B-B' of FIGS. 2A and 2B.

FIGS. 2A and 3A show a first state of the roll-slide display device 100 according to the exemplary embodiment of the present disclosure as an example and FIGS. 2B and 3B illustrate a second state of the roll-slide display device 100 according to the exemplary embodiment of the present disclosure as an example.

FIG. 4A is a cross-sectional view taken along the line A-A' of FIG. 2A and schematically shows a cross-section of the roll-slide display device 100 in the first state.

FIG. 4B is a cross-sectional view taken along the line B-B' of FIG. 2B and schematically shows a cross-section of the roll-slide display device 100 in the second state which extends in a second direction at the right.

The first state may be a default state of the roll-slide display device 100 and the second state may be an extended state of the roll-slide display device 100, but is not limited thereto.

A size of the first direction of the roll-slide display device 100 in the first state is smaller than that in the second state. A size of the first direction of the roll-slide display device 100 in the second state is extended and a size of a display unit 1110 located on the front surface is larger than that in the first state. For the convenience of description, a direction in which the roll-slide display device 100 is extended to the right is referred to as a second direction, a direction contracted to be switched from the second state to the first state is referred to as the first direction, and a vertical direction thereto is referred to as a third direction.

The roll-slide display device 100 of the present disclosure may be switched from the first state in which the display unit 1110 is disposed on the front surface, like a bar type mobile terminal, to the second state by extending the screen as illustrated in FIG. 2B. In the second state, an area of the display unit 1110 located on the front surface is extended and an area of a third area 1110c of the display unit 1110 located on the rear surface as illustrated in FIG. 3B is reduced. That is, the third area 1110c located on the rear surface in the first state may move to the front direction in the second state.

As described above, the roll-slide display device 100 of the present disclosure may use a flexible display in which the display unit 1110 is bent so that the position of the display unit 1110 is variable. At this time, the flexible display refers to a durable display which is manufactured on a thin and flexible substrate which can be warped, bent, folded, twisted, or rolled, like a paper, while maintaining a characteristic of a flat plane display of the related art to have a lightweight and is not easily broken.

At this time, the flexible display unit 1110 may be deformed from the default state to a bent state which is not a flat state (for example, a vertically or horizontally bent state). In this case, when an external force is applied to the display unit 1110, display unit 1110 may be deformed to be a flat state (or a less bent state) or a much more bent state.

In the meantime, the flexible display unit 1110 (which may also be referred to herein as a flexible display 1110 or a flexible display assembly 1110) is combined with a touch sensor to implement a flexible touch screen. When the touch is made on the flexible touch screen, the controller 180 (see FIG. 1) may perform control corresponding to the touch input. The flexible touch screen may be configured to sense a touch input not only in a default state, but also in the deformed state.

The touch sensor may sense touch (or a touch input) applied to the touch screen using at least one of various touch types such as a resistive film type, a capacitive type, an infrared type, an ultrasonic type, and a magnetic field type.

For example, the touch sensor may be configured to convert a change of a pressure which is applied to a specific portion of the touch screen or a capacity which is generated in a specific portion into an electrical input signal. The touch sensor may be configured to detect a position and an area where a touch subject which applies touch to the touch screen is touched on the touch sensor, a pressure and a capacitance at the time of touch, and the like.

The roll-slide display device 100 according to the exemplary embodiment of the present disclosure may include a deformation sensing unit which senses deformation of the flexible display unit 1110. The deformation sensing unit may be included in the sensing unit 140 (see FIG. 1).

The deformation sensing unit is provided in the flexible display unit 1110 or a case to sense information related to the deformation of the flexible display unit 1110. Here, the information related to the deformation may be a deformed direction of the flexible display unit 1110, how much the flexible display unit 1110 is deformed, the deformed position, the deformed time, an acceleration at that the deformed flexible display unit 1110 is restored, and the like. Further, various information which can be sensed by the bending of the flexible display unit 1100 may also be included.

The controller may change information displayed on the flexible display unit 1110 or generate a control signal to control a function of the roll-slide display device 100 of the present disclosure, based on information related to the deformation of the flexible display unit 1110 sensed by the deformation sensing unit.

In the meantime, the deformation of the state of the flexible display unit 1110 is not limited to the deformation by the external force. For example, when the flexible display unit 1110 is in the first state, the flexible display unit may be switched to the second state by an instruction of the user or an application. As described above, in order to deform the flexible display unit 1110 without external force, a driver may be included.

The flexible display unit 1110 according to the exemplary embodiment of the present disclosure is bent at 180 degrees so that a part is located on the front surface of the roll-slide display device 100 and the other part is located on the rear surface of the roll-slide display device 100. At this time, an area of the flexible display unit 1110 is determined so that if the area of the flexible display unit 1110 located on the front surface is increased, the area of the flexible display unit 1110 located on the rear surface is reduced.

In the meantime, the flexible display unit 1110 covers not only the front surface, but also the rear surface so that a space which is implemented in the back case of the related art to mount the antenna may be limited. Instead, the antenna may be implemented in the flexible display unit 1110. That is, the antenna on display AOD is an antenna in which an electrode layer with an engraved pattern and a dielectric layer configure a transparent film layer by layer. The antenna on display may be implemented to be thinner than a laser direct structuring (LDS) technique which is implemented by a copper-nickel plating method of the related art so that the antenna on display is hardly exposed to the outside with little effect on the thickness. Further, the signal may be transmitted or received also in the direction in which the display unit 1110 is located and the display device 100 in which the display unit 1110 is located on both surfaces like the present disclosure may use the antenna on display.

The roll-slide display device 100 of the present disclosure may include a first frame 1210, a second frame 1220, and a third frame 1230 as frames which configure an outer periphery. The first frame 1210 may slide to the second frame 1220 in the second direction and the third frame 1230 may slide to the second frame 1220 in the first direction.

The first frame 1210 and the second frame 1220 may include a front surface, a rear surface, and a side surface and configure an exterior appearance of a hexahedron of the roll-slide display device 100.

The flexible display unit 1110 may be divided into a first area 1110a, a second area 1110b, and a third area 1110c and the first area 1110a located at one side may be fixed to the front surface of the first frame 1210. Further, the third area 1110c adjacent to the first area 1110a in the first direction partially covers the front surface of the second frame 1220 and partially covers a rear surface of the second frame 1220.

The second area 1110b located at the other side of the flexible display unit 1110 is located on the rear surface of the roll-slide display device 100 and is not directly coupled to the second frame 1220, but may be coupled to the third frame 1230.

The third frame 1230 is a plate-shaped member which is slidably coupled in the first direction on the rear surface of the second frame 1220.

As illustrated in FIG. 3B, a slide slot 1330 extending in the second direction is formed in the second frame 1220, and the third frame 1230 moves along the slide slot 1330. Even though in FIG. 3B, it is illustrated that the slide slot 1330 is formed on the rear surface of the second frame 1220, the slide slot 1330 may be formed on the side surface of the second frame 1220.

As described above, the flexible display unit 1110 according to the exemplary embodiment of the present disclosure may include a first area 1110a fixed to the first frame 1210, a second area 1110b fixed to the third frame 1230, and a third area 1110c which is located between the first area 1110a and the second area 1110b. The third area 1110c may be disposed on the front surface or the rear surface according to the state of the roll-slide display device 100.

The first area 1110a and the second area 1110b maintain a flat default state without changing the curvatures, but the third area 1110c is bent to the other side of the second frame 1220 to be bent to the rear surface. When the state is switched from the first state to the second state, the area of the third area 1110c located in the first direction of the first area 1110a may be increased. A position bent in the third area 1110c may vary according to a sliding position of the second frame 1220. Since in the foldable display device 100 which is unfolded like a book, only a specific position is repeatedly bent, there is a high risk of damage due to the repeated force applied to only one location. In contrast, the bent portion of the flexible display unit 1110 of the present disclosure varies depending on a state of the roll-slide display device 100 so that the fatigue due to the deformation which is intensively applied to only one location may be reduced, which suppresses the damage of the flexible display unit 1110.

The first frame 1210 may include a first front surface portion 1210a (see FIGS. 4A and 4B), a first rear surface portion 1210b (see FIG. 3A), and a second rear surface portion 1210c (see FIG. 3B). The first front surface portion 1210a is coupled to the first area 1110a of the flexible display unit 1110. The first rear surface portion 1210b is outwardly exposed even in the first state on the rear surface. The second rear surface portion 1210c is covered by the second area 1110b and the third area 1110c of the flexible display unit 1110 in the first state and is exposed only in the second state.

The first rear surface unit 1210b is always exposed to the outside so that the camera 1340, the flash, a proximity sensor 1350, and the like may be disposed.

A general bar-type terminal has a display unit on only one side so that cameras need on both the rear surface and the front surface to capture an object located at the opposite side to the user and capture the user. However, in the roll-slide display device 100 of the present disclosure, the flexible display unit 1110 is located also on the rear surface so that not only the object located at the opposite side to the user, but also the user can be captured using one camera 1340. The camera 1340 may include a plurality of cameras having different angles of view such as a wide angle, a super-wide angle, or a telescopic angle. In addition to the camera 1340, the proximity sensor 1350, the sound output unit, and the like may be located and the antenna 1360 may be implemented on the first rear surface portion 1210b.

The first frame 1210 may further include a side surface portion 1210d which encloses the circumference.

The side surface portion 1210d covers side surfaces on both sides of the third direction and one side of the first direction and forms an external appearance of the roll-slide display device 100 excluding an end in the first direction through which the second frame 1220 is drawn in and out. In the side surface portion 1210d, an interface unit to connect a power port or an ear jack or a user input unit such as a volume button may be disposed. When a metal material is included, the side surface portion 1210d may serve as an antenna.

The second frame 1220 may include a second front surface portion 1220a located on the rear surface of the first front surface portion 1210a and a third rear surface portion 1220b which covers the rear surface of the second rear surface portion 1210c (see FIGS. 4A and 4B). When the state is switched to the second state, the second front surface portion 1220a may support the rear surface of the extended flexible display unit 1110 of the front surface portion. That is, the second front surface portion 1220a may support the third area 1110c of the display unit 1110 in the second state.

The third area 1110c of the flexible display unit 1110 is wound around the end portion of the first direction of the second frame 1220 and a cylindrical roller 1270 may be provided so that the wound portion is gently bent with a predetermined curvature.

The roller 1270 is disposed on the end portion of the first direction in the second frame 1220 and abuts onto an inner surface of the flexible display unit 1110 and rotates together with the movement of the flexible display unit 1110. By doing this, when the first frame 1210 slides, the flexible display unit 1110 may slide from the rear surface to the front surface or from the front surface to the rear surface.

A portion of the flexible display unit 1110 wound around the roller 1270 is located on the end portion of the first direction of the roll-slide display device 100 so that when an impact such as dropping of the roll-slide display device 100 is applied, there is a risk of damage.

In order to suppress the damage, the second frame 1220 may further include a side frame 1220d to protect the flexible display unit 1110 wound around the roller 1270.

A battery 1250 may be disposed in a space between the second front surface portion 1220a and the second rear surface portion 1210c and the battery 1250 may be an embedded or replaceable battery.

In the second state, a support frame 1430 may be further disposed between the flexible display unit 1110 and the second front surface portion 1220a.

The side frame 1220d may include an opaque material or a transparent material or may be configured by mixing the opaque material and the transparent material. When the side frame 1220d includes a transparent portion formed of a transparent material, an image or letters output from the flexible display unit 1110 may be seen through the transparent portion. Further, the user input may be performed on a side surface using a touch sensor of the flexible display unit 1110. For the purpose of touch input, the side frame 1220d may partially include a conductive material. A protrusion is formed in a portion including the conductive material so that the user touches the protrusion to input the user's instruction.

Further, as illustrated in FIGS. 4A and 4B, the side frame 1220d is configured such that a center portion of the inner surface corresponding to the curvature of the flexible display unit 1110 wound around the roller 1270 is formed to be thicker to ensure the rigidity with a natural curved surface.

Further, the side frame 1220d of the present disclosure may suppress the damage problem caused when a bent surface of the flexible display unit 1110 is outwardly exposed in an out-folding manner so that the durability of the roll-slide display device 100 may be improved.

Figure 5:
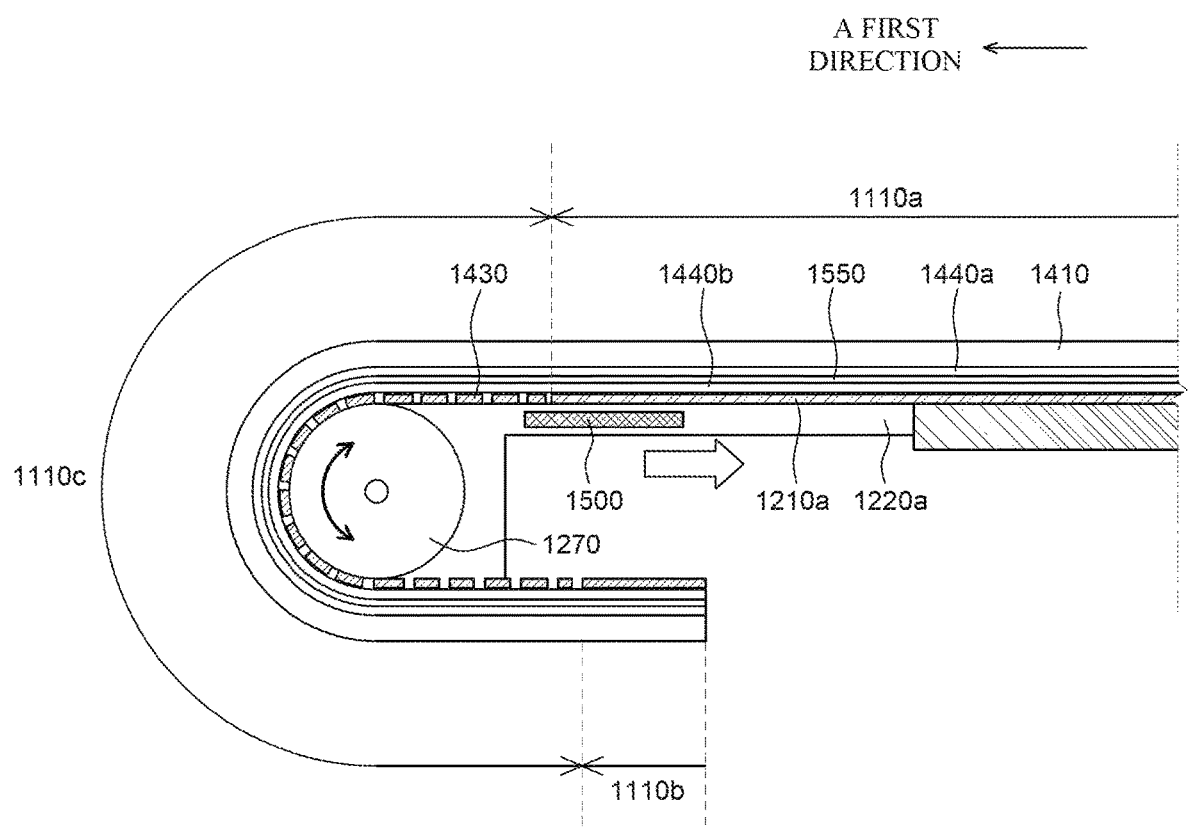
FIG. 5 is a view schematically illustrating a part of a cross-section of FIG. 4A.

FIG. 5 is a view schematically illustrating a part of a cross-section of FIG. 4A.

Figure 6A:
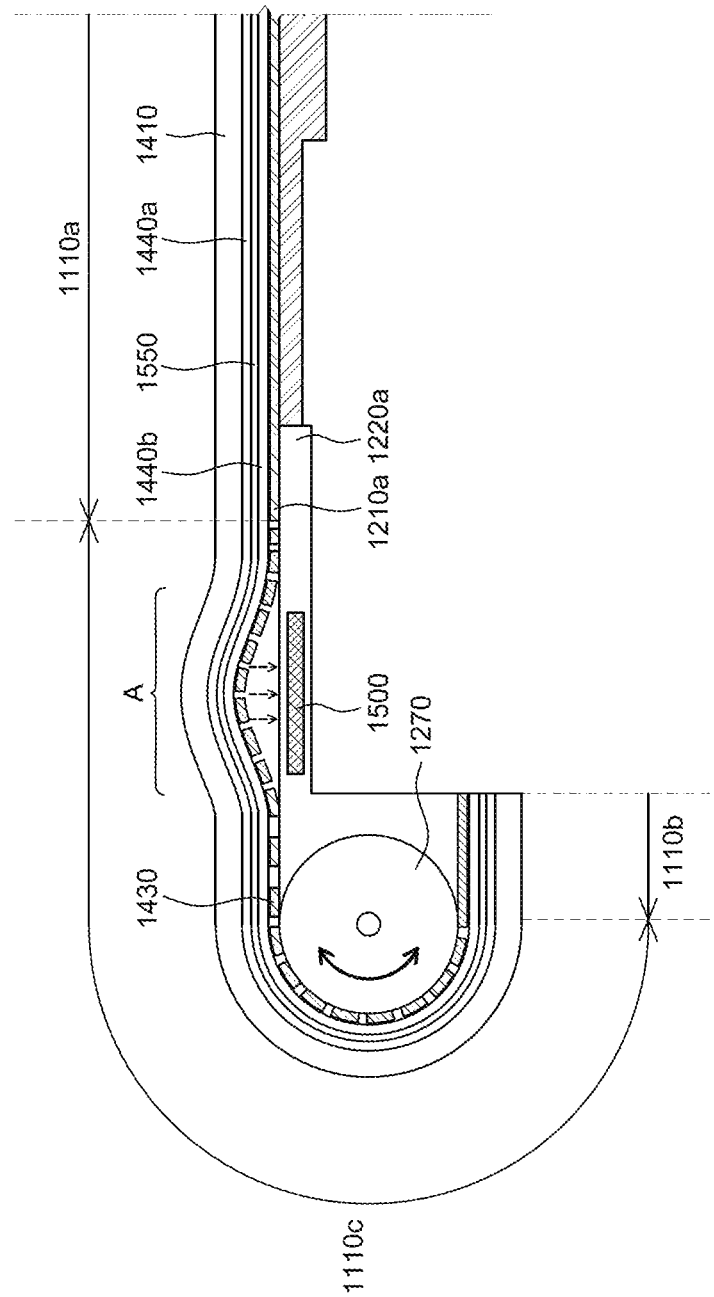
FIGS. 6A and 6B are views schematically illustrating a part of a cross-section of FIG. 4B.
Figure 6B:
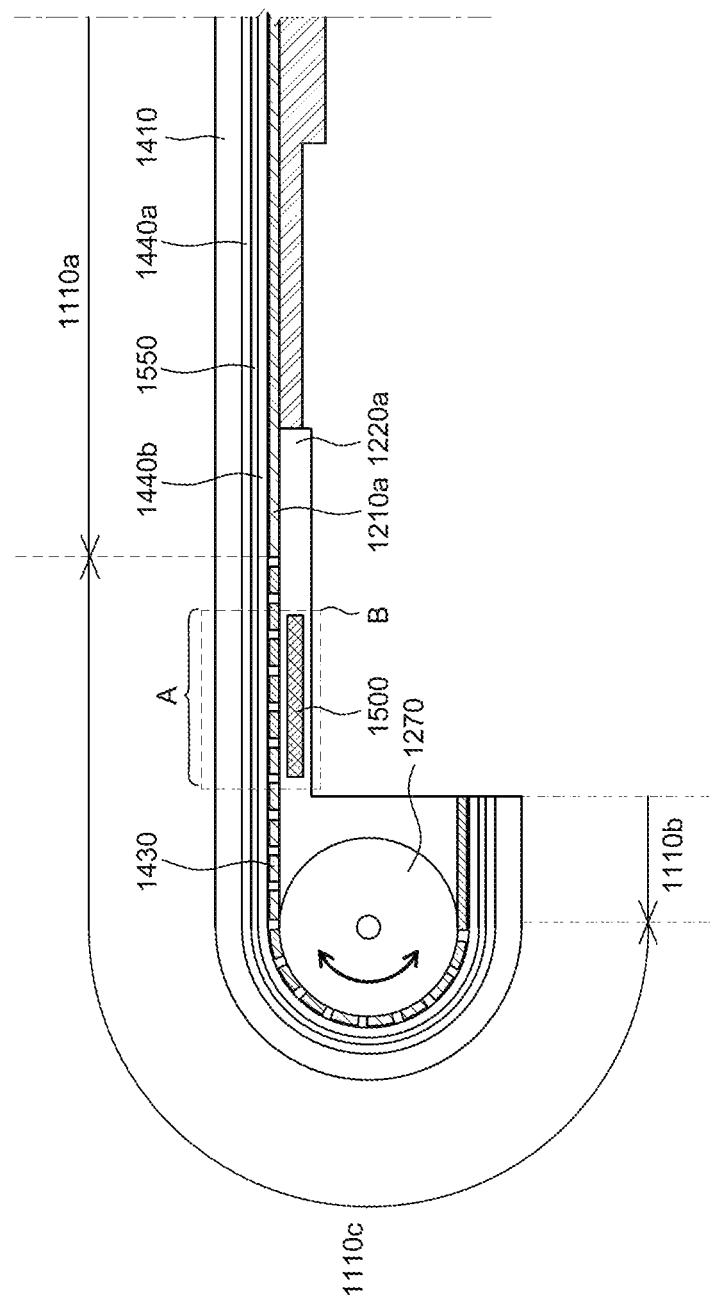

FIGS. 6A and 6B are views schematically illustrating a part of a cross-section of FIG. 4B.

Figure 7:
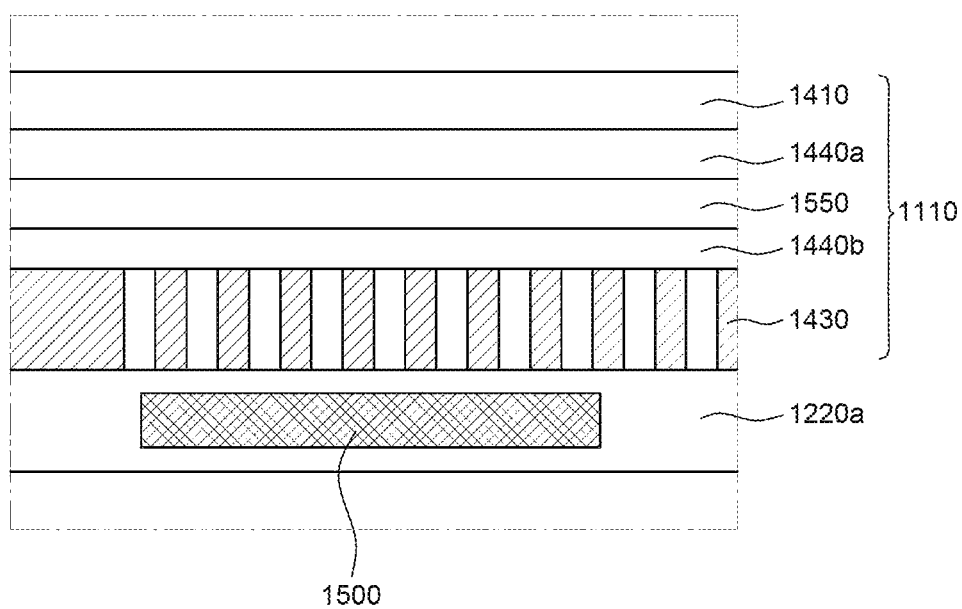
FIG. 7 is an enlarged view of a part B of FIG. 6B.

FIG. 7 is a view enlarging a part B of FIG. 6B.

FIG. 5 schematically shows a part of the cross-section of the roll-slide display device of the exemplary embodiment of the present disclosure in the first state. FIGS. 6A and 6B schematically show a part of the cross-section of the roll-slide display device of the exemplary embodiment of the present disclosure in the second state.

Referring to FIGS. 5 to 7, the flexible display unit 1110 of the present disclosure includes a display panel 1410 which outputs an image and a support frame 1430 which supports a rear surface of the display panel 1410.

The display unit 1110 may be divided into a first area 1110a located at one side, a second area 1110b located at the other side, and a third area 1110c located between the first area 1110a and the second area 1110b.

The first area 1110a located at one side of the display unit 1110 may be located above the first front surface portion 1210a of the first frame.

Further, the third area 1110c adjacent to the first area 1110a in the first direction may be partially located above the second front surface portion 1220a of the second frame and may be partially located below the third rear surface portion of the second frame.

The second area 1110b located at the other side of the flexible display unit 1110 is located on the rear surface of the roll-slide display device and is not directly coupled to the second frame, but may be coupled to the third frame.

The second front surface portion 1220a of the second frame may be disposed on the rear surface of the support frame 1430.

The display panel 1410 may use any one of various display panels such as an organic light emitting display panel or a liquid crystal display panel.

Even though it is not illustrated in detail in the drawings, the display panel 1410 is a configuration for displaying images to the user and may include a plurality of sub pixels.

In the display panel 1410, the plurality of scan lines and the plurality of data lines intersect and each of the plurality of sub pixels may be connected to the scan line and the data line. In addition, each of the plurality of sub pixels may be connected to the high potential power line, the low potential power line, the initialization signal line, the emission control signal line, and the like.

The sub pixel is a minimum unit which configures a screen and each of the plurality of sub pixels may include a light emitting diode and a driving circuit for driving the light emitting diode. The plurality of light emitting diodes may be defined in different ways depending on a type of the display panel 1410. For example, when the display panel 1410 is an organic light emitting display panel, the light emitting diode may be an organic light emitting diode which includes an anode, a light emitting unit, and a cathode. Hereinafter, even though the description will be made under the assumption that the light emitting diode is the organic light emitting diode, the type of the light emitting diode is not limited thereto.

A pixel circuit is a circuit for controlling the driving of the light emitting diode. For example, the pixel circuit may be configured to include a plurality of transistors and a capacitor, but is not limited thereto.

Further, the display panel 1410 may have flexibility so as to be bent in accordance with the bending of the roll-slide display device.

The support frame 1430 may be configured by a metal material having a rigidity, such as stainless use steel SUS, copper (Cu), and aluminum (Al), and is provided on the rear surface of the display panel 1410 to support the display panel 1410.

In the support frame 1430, a predetermined pattern is formed, but it is not limited thereto.

A thickness of the support frame 1430 is 0.5 t, but is not limited thereto.

Even though not illustrated, a driver, such as a motor, slides the first frame to the second direction (an arrow direction illustrated in FIG. 5) relative to the second frame and slides the third frame to the first direction relative to the second frame.

When the first state is switched to the second state, if the second frame moves by a first distance, the flexible display unit 1110 may move by a second distance corresponding to twice the first distance. In order to move the end portion of the flexible display unit 1110 by the second distance, the third frame also needs to move from the second frame by the same distance as the second frame.

Accordingly, the driver may use a linear motor which linearly operates to compensate for such a deformation. When the driver is contracted, the length is not larger than a width of the first frame in the third direction so that the linear motor may be configured by at least three stages, but is not limited thereto.

Even though only one driver may be provided, in order to stably change the state of the roll-slide display device, one pair of drivers may be provided on both sides in the third direction. A component such as a battery may be disposed between one pair of drivers.

In the meantime, in the roll-slide display device of the present disclosure, a magnetic sheet 1550 is disposed on the rear surface of the display panel 1410 and a magnet 1500 is disposed in the second front surface portion 1220a of the second frame to be opposite thereto to restore the wrinkled portion (the A portion of FIG. 6A) by magnetic force.

For example, when the roll-slide display device is changed from the default state of FIG. 5 to the extended state of FIG. 6A, the restoration of the deformation of the bent display unit 1110 is delayed to cause the wrinkles. That is, when a stack of the display unit 1110 which is bent on the side surface of the roller 1270 in the default state of the roll-slide display device is changed to the extended state, the restoration delay of the deformed portion may cause the wrinkled shape as illustrated by the A portion.

However, according to the present disclosure, the magnetic sheet 1550 is disposed on the rear surface of the display panel 1410 and the magnet 1500 is disposed in the second front surface portion 1220a of the second frame to be opposite thereto so that the wrinkled portion is restored with the magnetic force (see FIG. 6B).

For example, the magnetic sheet 1550 may be formed by mixing ferromagnetic powder and polymer resin. Such a magnetic sheet 1550 has flexibility as compared with the existing hard metal plate and may be easily processible and adjust a magnetic force according to the content of the ferromagnetic powder.

The ferromagnetic materials are materials which are magnetized even in the absence of an external magnetic field. Monoatomic ferromagnetic materials include iron, nickel, cobalt, and the like, and metal oxides such as iron oxide, chromium oxide, and ferrite may also have a ferromagnetic property.

The magnetic sheet 1550 may be attached on the rear surface of the display panel 1410 by means of a first adhesive film 1440a. Further, the support frame 1430 may be attached onto the rear surface of the magnetic sheet 1550 by means of a second adhesive film 1440b.

The first and second adhesive films 1440a and 1440b may be configured by optically clear adhesive films (OCA films), but are not limited thereto.

For example, the first adhesive film 1440a may have a thickness of approximately 25 □μm, and the second adhesive film 1440b may have a thickness of approximately 10 μm, but are not limited thereto. In this case, the thickness of the magnetic sheet 1550 may be approximately 300 μm to 400 μm.

The magnetic sheet 1550 may be disposed on the entire rear surface of the display unit 1110, but is not limited thereto and may be disposed only on the rear surface of the third area 1110c of the display unit 1110.

The magnet 1500 may be disposed to be adjacent to the roller 1270 in the bent portion.

The magnet 1500 may be disposed along the roller 1270, but is not limited thereto and may be divided into a plurality of magnets to be disposed along the roller 1270.

The exemplary embodiments of the present disclosure can also be described as follows:

According to an aspect of the present disclosure, there is provided a foldable display device. The foldable display device includes a first frame, a second frame, and a third frame which configure an outer periphery, a flexible display unit which includes a first area coupled to the first frame, a second area coupled to the third frame, and a third area located between the first area and the second area and a magnet provided in the second frame, wherein the flexible display unit includes a display panel and a magnetic sheet disposed on a rear surface of the display panel, and the first frame slides to left and right with respect to the second frame to implement a default state and an extended state.

The roll-slide display device may further include a support frame which supports the display panel on the rear surface of the display panel, a first adhesive film disposed between the display panel and the magnetic sheet and a second adhesive film disposed between the magnetic sheet and the support frame.

The first area may be fixed to a front surface of the first frame and a part of the third area which may be adjacent to the first area in a first direction may cover a front surface of the second frame and the other part may cover a rear surface of the second frame.

The second area may be located on a rear surface of the roll-slide display device and may be not directly coupled to the second frame, but may be coupled to the third frame.

A slide slot may be disposed on a rear surface of the second frame to extend in a second direction and the third frame may move along the slide slot.

The first frame may include a first front surface portion to which the first area may be coupled, a first rear surface portion which may be exposed to the outside from a rear surface even in the default state and a second rear surface portion which may be covered by the second area and the third area in the default state and may be exposed only in the extended state.

The second frame may include a second front surface portion located on a rear surface of the first front surface portion and a third rear surface portion which may cover a rear surface of the second rear surface portion, and the second front surface portion may support the third area of the flexible display unit in the extended state.

The roll-slide display device may further include a roller located on an end portion of the first direction in the second frame, wherein the roller may abut onto an inner surface of the flexible display unit and rotates together with movement of the flexible display unit so that when the first frame may slide, the flexible display unit may move from a rear surface to a front surface or from the front surface to the rear surface.

The support frame may be disposed between the flexible display unit and the second front surface portion in the extended state.

The magnet may be disposed in the second front surface portion.

The magnetic sheet may be configured by mixing ferromagnetic powder in a polymer resin.

The first and second adhesive films may be configured by optically clear adhesive films (OCA films).

The magnetic sheet may be disposed on the entire rear surface of the flexible display unit.

The magnetic sheet may be disposed only on a rear surface of the third area.

The magnet may be disposed to be adjacent to the roller.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A slidable display device, comprising:
   a first frame, a second frame, and a third frame that define an outer periphery;
   a flexible display which includes a first portion coupled to the first frame, a second portion coupled to the third frame, and a third portion located between the first portion and the second portion, wherein the flexible display further includes:
   a display panel;
   a roller located on an end portion of the second frame;
   a support frame configured to support the display panel on a rear surface of the display panel; and
   a first adhesive film disposed between the display panel and the support frame,
   wherein the support frame includes an opening pattern in an area overlapping the roller, and
   wherein the first frame is configured to slide with respect to the second frame to implement a default state and an extended state of the flexible display, respectively.

2. The slidable display device according to claim 1, further comprising:
   a magnetic sheet disposed on the rear surface of the display panel; and
   a magnet provided in the second frame.

3. The slidable display device according to claim 2, further comprising:
   a first adhesive film disposed between the display panel and the magnetic sheet; and
   a second adhesive film disposed between the magnetic sheet and the support frame.

4. The slidable display device according to claim 1, wherein the first portion is fixed to a front surface of the first frame, a first part of the third portion which is adjacent to the first portion in a first direction covers a front surface of the second frame, and a remaining second part of the third portion covers a rear surface of the second frame.

5. The slidable display device according to claim 1, wherein the second portion is located on a rear surface of the slidable display device and is indirectly coupled to the second frame and directly coupled to the third frame.

6. The slidable display device according to claim 1, wherein the second frame includes a slide slot disposed on a rear surface of the second frame, the third frame configured to move along the slide slot.

7. The slidable display device according to claim 2, wherein the first frame includes:
   a first front surface portion coupled to the first portion;
   a first rear surface portion at a rear surface of the first frame, the first rear surface portion exposed to an external environment in the default and extended states; and
   a second rear surface portion which is covered by the second portion and the third portion in the default state and is exposed to the external environment only in the extended state.

8. The slidable display device according to claim 7, wherein the second frame includes:
   a second front surface portion located on a rear surface of the first front surface portion of the first frame; and
   a third rear surface portion which covers a rear surface of the second rear surface portion of the first frame,
   wherein the second front surface portion of the second frame supports the third portion of the flexible display unit in the extended state.

9. The slidable display device according to claim 1, wherein the roller abuts onto an inner surface of the flexible display and rotates together with movement of the flexible display so that when the first frame slides, the flexible display moves in response from a rear surface of the first frame to a front surface of the first frame or from the front surface to the rear surface of the first frame.

10. The slidable display device according to claim 8, wherein the support frame is disposed between the flexible display and the second front surface portion of the second frame in the extended state.

11. The slidable display device according to claim 8, wherein the magnet is disposed in the second front surface portion of the second frame.

12. The slidable display device according to claim 2, wherein the magnetic sheet includes ferromagnetic powder and a polymer resin.

13. The slidable display device according to claim 3, wherein the first and second adhesive films include optically clear adhesive films.

14. The slidable display device according to claim 2, wherein the magnetic sheet is disposed on an entire rear surface of the flexible display.

15. The slidable display device according to claim 2, wherein the magnetic sheet is disposed only on a rear surface of the third portion of the flexible display.

16. The slidable display device according to claim 2, wherein the magnet is disposed adjacent to the roller.

17. The slidable display device according to claim 1, wherein the display panel includes a plurality of sub-pixels, and
   wherein each of the plurality of sub-pixels includes a light emitting diode and a pixel circuit for driving the light emitting diode.

18. The slidable display device according to claim 17, wherein the light emitting diode includes an anode, a light emitting unit, and a cathode.

19. The slidable display device according to claim 2, wherein the magnet is disposed in the second frame at a location corresponding to the opening pattern of the support frame.

* * * * *